US006557135B1

(12) United States Patent
Balachandran et al.

(10) Patent No.: US 6,557,135 B1
(45) Date of Patent: Apr. 29, 2003

(54) CYCLING THROUGH ENTIRETY OF ERROR-INDICATING ACKNOWLEDGMENT INFORMATION

(75) Inventors: Krishna Balachandran, Middletown, NJ (US); Richard P. Ejzak, Wheaton, IL (US); Sanjiv Nanda, Clarksburg, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/573,017

(22) Filed: May 17, 2000

(51) Int. Cl.$^7$ .............................................. G08C 25/02
(52) U.S. Cl. ...................... 714/748; 714/750
(58) Field of Search ................................ 382/9; 370/18, 370/95.1, 230; 395/115; 707/3; 358/1.15; 714/748, 750

(56) References Cited

U.S. PATENT DOCUMENTS

| | | | | |
|---|---|---|---|---|
| 5,341,438 A | * | 8/1994 | Clifford | 382/9 |
| 5,371,734 A | * | 12/1994 | Fisher | 370/18 |
| 5,555,266 A | * | 9/1996 | Buchholz et al. | 370/95.1 |
| 5,870,535 A | * | 2/1999 | Duffin et al. | 395/115 |
| 5,963,935 A | * | 10/1999 | Ozbutun et al. | 707/3 |
| 6,141,656 A | * | 10/2000 | Ozbutun et al. | 707/3 |
| 6,392,993 B1 | * | 5/2002 | Hamilton et al. | 370/230 |
| 6,433,885 B1 | * | 8/2002 | Verghese et al. | 358/1.15 |

OTHER PUBLICATIONS

Krishna Balachandran, Richard P. Ejzak, Sanjiv Nanda, "Efficient Transmission of ARQ Feedback," Dec. 1998, 4 pages.

Krishna Balachandran, Richard P. Ejzak, Sanjiv Nanda, "Efficient Transmission of ARQ Feedback," Jan. 1999, pp. 1–6, Lucent Technologies, ETSI SMG 2 WPA/WPB Meeting, TDoc SMG2 WPA 150/99 (2A99–150), TDoc SMG2 WPB 112/99 (2A99–112).

Krishna Balachandran, Richard P. Ejzak, Sanjiv Nanda, "EGPRS RLC Performance with Efficient Transmission of ARQ Feedback Through Segmented Bitmaps," Apr. 12, 1999, pp. 1–6, Lucent Technologies, ETSI SMG2 WPA, SMG2 Edge TDOC 2A99–403, Dublin, Ireland.

Krishna Balachandran, Richard P. Ejzak, Sanjiv Nanda, "Efficient Transmission of ARQ Feedback in EGPRS Through Segmented Bitmaps," May 17, 1999, pp. 1–9, Lucent Technologies, ETSI AMG2 Working Session on EDGE, Tdoc 2E99–126, Agenda item 6.2, Bois D'Arcy, France.

Krishna Balachandran, Richard P. Ejzak, Sanjiv Nanda, "Efficient Transmission of ARQ Feedback for EGPRS Radio Link Control," Sep. 1999, pp. 1–8.

* cited by examiner

*Primary Examiner*—David Ton
(74) *Attorney, Agent, or Firm*—Patti & Brill, LLC

(57) ABSTRACT

A system includes a generator component that determines a plurality of portions that comprise an entirety of error-indicating acknowledgement information. The system includes a generator component that cycles through the plurality of portions that comprise the entirety of the error-indicating acknowledgement information to send the error-indicating acknowledgement information.

51 Claims, 13 Drawing Sheets

FIG. 5

| BOW value | EOW value | Description |
|---|---|---|
| 1 | 1 | The associated bitmap feedback represents the entire receiver window. All RLC data blocks up to the beginning of the window are implicitly acknowledged. All RLC data blocks with sequence numbers modulo greater than the last '1' in the bitmap are implicitly negatively acknowledged. |
| 1 | 0 | The associated bitmap feedback represents an initial portion of the receiver window, including the beginning of the window, but not the end of the window. All RLC data blocks up to the beginning of the window are implicitly acknowledged. |
| 0 | 0 | The associated bitmap feedback represents a middle portion of the receiver window, including neither the beginning nor the end of the window. |
| 0 | 1 | The associated bitmap feedback represents a trailing portion of the receiver window, not including the beginning of the window, but including the end of the window. All RLC data blocks with sequence numbers modulo greater than the last '1' in the bitmap are implicitly negatively acknowledged. |

< Packet Downlink Ack/Nack message content > ::=
  < MESSAGE_TYPE : bit (6) > —602
604— < DOWNLINK_TFI : bit (5) >
  < TBF_RELEASE : bit (1) > —606
608— {L | H < Channel Quality Report : Channel Quality Report struct : bit (47) >}
610— {L | H < Channel Request Description : Channel Request Description IE : bit (24) >}
  spare bits : bit (6)
612— < Ack/Nack Description : Ack/Nack Description IE : bit (L) >
:: ;

| L | Channel Quality Report included? | Channel Request Description included? |
|---|---|---|
| 148 | No | No |
| 124 | No | Yes |
| 101 | Yes | No |
| 77 | Yes | Yes |

612

```
< Ack/Nack Description IE > ::=
    801 —{ < FINAL_ACK_INDICATION : bit (1) >
          < BEGINNING_OF_WINDOW (BOW); bit (1) > — 401
    403 —< END_OF_WINDOW (EOW); bit (1) >
          < STARTING_SEQUENCE_NUMBER; bit (11) > — 803
    805 —< COMPRESSED_BITMAP_LENGTH (Lc) : bit (7) >
          < COMPRESSED_BITMAP_STARTING_COLOR_CODE: bit (1) > — 807
    809 —< COMPRESSED_RECEIVED_BLOCK_BITMAP : bit (Lc) >     ⎫
    811 —< UNCOMPRESSED_RECEIVED_BLOCK_BITMAP; bit (L-Lc-22) >}; ⎬ 300
                                                                 ⎭
```

FINAL_ACK_INDICATION (1 bit field) —801
This field indicates whether the entire TBF is being acknowledged. If the entire TBF is being acknowledged, the SSN, CRBB and URBB fields contain no information and shall be ignored.
0    retransmissions are requested and the TBF is incomplete.
1    no retransmissions are requested and this message indicates acknowledgement of all RLC data in the TBF.

BEGINNING_OF_WINDOW (1 bit field) —401
This bit indicates if the Ack/Nack bitmap starts at the beginning of the window.
0    SSN not equal to $(V(Q)+1)$ mod 2048.
1    SSN = $(V(Q)+1)$ mod 2048

END_OF_WINDOW (1 bit field) —403
This bit indicates if the end of the receiver window is included in the bitmap(s).
0    End of the receiver window, V(R), is not explicitly included in the bitmap.
1    End of the receiver window, V(R), is explicitly included in the bitmap.

STARTING_SEQUENCE_NUMBER (SSN) (11 bit field) —803
Range 0 to 2047
The SSN indicates the Block Sequence Number of the first RLC block for which the Ack/Nack receipt status is indicated within the bitmap. The SSN is determined using S/P, PBSN and $V(Q)$.

COMPRESSED_BITMAP_LENGTH (7 bit field) —805
Range 0 to 127
This field represents the length of the compressed bitmap. Compression is carried out using T.4 run length coding.

COMPRESSED_BITMAP_STARTING_COLOR_CODE (1 bit field) —807
This bit indicates if the first code word in the compressed bitmap (i.e., CRBB) represents a run length of ones or a run length of zeros.
0    First code word in CRBB represents run length of zeros.
1    First code word in CRBB represents run length of ones.

COMPRESSED_RECEIVE_BLOCK_BITMAP (CRBB) ($Lc$ bit field) —809
The CRBB is a compressed bitmap. Compression is carried out starting at SSN using T.4 run length coding.

UNCOMPRESSED_RECEIVE_BLOCK_BITMAP (URBB) ($L-Lc-22$ bit field) —811
The URBB is an uncompressed bitmap representing Block Sequence Numbers. The bitmap is indexed relative to SSN as follows:
        BSN = (ESN_CRBB+bit_number) modulo 2048,    for bit_number=1 to $L-Lc-22$.
where ESN_CRBB represents the ending sequence number of the CRBB. The value of each bit is encoded as:
0    Negative acknowledgement of the RLC data block with BSN=(SSN+bit_number) mod 2048
1    Positive acknowledgement of the RLC data block with BSN=(SSN+bit_number) mod 2048

}300

| S/P | Feedback Request (Poll) Description |
|---|---|
| 00 | Nothing (RRBP field invalid) |
| 01 | Packet Downlink Ack/Nack message containing FPB (First Partial Bitmap), drop channel quality report |
| 10 | Packet Downlink Ack/Nack message containing NPB (Next Partial Bitmap), drop channel quality report |
| 11 | Packet Downlink Ack/Nack message containing NPB and Channel Quality Report |

FIG. 12A

| One run length | Code word | Zero run length | Code word |
|---|---|---|---|
| 0 | 00110101 | 0 | 0000110111 |
| 1 | 000111 | 1 | 10 |
| 2 | 0111 | 2 | 11 |
| 3 | 1000 | 3 | 010 |
| 4 | 1011 | 4 | 011 |
| 5 | 1100 | 5 | 0011 |
| 6 | 1110 | 6 | 0010 |
| 7 | 1111 | 7 | 00011 |
| 8 | 10011 | 8 | 000101 |
| 9 | 10100 | 9 | 000100 |
| 10 | 00111 | 10 | 0000100 |
| 11 | 01000 | 11 | 0000101 |
| 12 | 001000 | 12 | 0000111 |
| 13 | 000011 | 13 | 00000100 |
| 14 | 110100 | 14 | 00000111 |
| 15 | 110101 | 15 | 000011000 |
| 16 | 101010 | 16 | 0000010111 |
| 17 | 101011 | 17 | 0000011000 |
| 18 | 0100111 | 18 | 0000001000 |
| 19 | 0001100 | 19 | 00001100111 |
| 20 | 0001000 | 20 | 00001101000 |
| 21 | 0010111 | 21 | 00001101100 |
| 22 | 0000011 | 22 | 00000110111 |
| 23 | 0000100 | 23 | 00000101000 |
| 24 | 0101000 | 24 | 00000010111 |
| 25 | 0101011 | 25 | 00000011000 |
| 26 | 0010011 | 26 | 000011001010 |

FROM FIG. 12A

| | | | |
|---|---|---|---|
| 27 | 0100100 | 27 | 000011001011 |
| 28 | 0011000 | 28 | 000011001100 |
| 29 | 00000010 | 29 | 000011001101 |
| 30 | 00000011 | 30 | 000001101000 |
| 31 | 00011010 | 31 | 000001101001 |
| 32 | 00011011 | 32 | 000001101010 |
| 33 | 00010010 | 33 | 000001101011 |
| 34 | 00010011 | 34 | 000011010010 |
| 35 | 00010100 | 35 | 000011010011 |
| 36 | 00010101 | 36 | 000011010100 |
| 37 | 00010110 | 37 | 000011010101 |
| 38 | 00010111 | 38 | 000011010110 |
| 39 | 00101000 | 39 | 000011010111 |
| 40 | 00101001 | 40 | 000001101100 |
| 41 | 00101010 | 41 | 000001101101 |
| 42 | 00101011 | 42 | 000011011010 |
| 43 | 00101100 | 43 | 000011011011 |
| 44 | 00101101 | 44 | 000001010100 |
| 45 | 00000100 | 45 | 000001010101 |
| 46 | 00000101 | 46 | 000001010110 |
| 47 | 00001010 | 47 | 000001010111 |
| 48 | 00001011 | 48 | 000001100100 |
| 49 | 01010010 | 49 | 000001100101 |
| 50 | 01010011 | 50 | 000001010010 |
| 51 | 01010100 | 51 | 000001010011 |
| 52 | 01010101 | 52 | 000000100100 |

| 53 | 00100100 | 53 | 000000110111 |
|---|---|---|---|
| 54 | 00100101 | 54 | 000000111000 |
| 55 | 01011000 | 55 | 000000100111 |
| 56 | 01011001 | 56 | 000000101000 |
| 57 | 01011010 | 57 | 000001011000 |
| 58 | 01011011 | 58 | 000001011001 |
| 59 | 01001010 | 59 | 000000101011 |
| 60 | 01001011 | 60 | 000000101100 |
| 61 | 00110010 | 61 | 000001011010 |
| 62 | 00110011 | 62 | 000001100110 |
| 63 | 00110100 | 63 | 000001100111 |

| One run length | Code word | Zero run length | Code word |
|---|---|---|---|
| 64 | 11011 | 64 | 0000001111 |
| 128 | 10010 | 128 | 000011001000 |
| 192 | 010111 | 192 | 000011001001 |
| 256 | 0110111 | 256 | 000001011011 |
| 320 | 00110110 | 320 | 000000110011 |
| 384 | 00110111 | 384 | 000000110100 |
| 448 | 01100100 | 448 | 000000110101 |
| 512 | 01100101 | 512 | 0000001101100 |
| 576 | 01101000 | 576 | 0000001101101 |
| 640 | 01100111 | 640 | 0000001001010 |
| 704 | 011001100 | 704 | 0000001001011 |
| 768 | 011001101 | 768 | 0000001001100 |
| 832 | 011010010 | 832 | 0000001001101 |
| 896 | 011010011 | 896 | 0000001110010 |
| 960 | 011010100 | 960 | 0000001110011 |

1401 points to the row starting with 64.

CYCLING THROUGH ENTIRETY OF ERROR-INDICATING ACKNOWLEDGMENT INFORMATION

TECHNICAL FIELD

This invention relates generally to telecommunications and more particularly to transmission of segmented bitmaps.

BACKGROUND OF THE INVENTION

Enhanced General Packet Radio Service (EGPRS) uses bitmaps to provide automatic repeat request (ARQ) feedback to a transmitting device component. The bitmaps represent a receipt status (e.g. Acknowledgment/Negative Acknowledgement or Ack/Nack status) of individual Radio Link Control (RLC) data blocks that are sent from a transmitting device to a receiving device in groups that comprise a transmission window. When the receiving device receives a number of blocks correctly and receives a number of blocks incorrectly, then the receiving device sends to the transmitting device a bitmap composed of both "1"s and "0"s. Hence, through bitmap feedback, the receiving device requests that the transmitting device to re-transmit specific blocks.

Because bitmaps associated with high-speed links are too large for the receiving device to send in a single transmission, the bitmaps are typically segmented. So, the receiving device usually executes the ARQ by sending the bitmap only one segment at a time. In one approach, the feedback is truncated(for example, when a first segment of the bitmap that corresponds to the beginning data blocks of the transmission is sent repeatedly). Such an approach undesirably delays the transmitting device in receiving bitmap feedback concerning those data blocks of the transmission that are transmitted subsequent to the beginning blocks of the transmission window. The approach suffers from an inefficiency of the transmitting device not receiving early feedback that represents a more current received state of all the data blocks of the transmission.

Therefore, a need exists for enhanced reporting of the current received state of all data blocks of a transmission that uses a transmission window multiple times.

SUMMARY OF THE INVENTION

Pursuant to the present invention, shortcomings of the existing art are overcome and additional advantages are provided through the provision of cycling through an entirety of error-indicating acknowledgment information.

The invention in one embodiment encompasses a method. The method determines a plurality of portions that comprise an entirety of error-indicating acknowledgement information. The plurality of portions that comprise the entirety of the error-indicating acknowledgement information are cycled through to send the error-indicating acknowledgement information.

Another embodiment of the invention encompasses a system. The system includes a generator component that determines a plurality of portions that comprise an entirety of error-indicating acknowledgement information. The system includes a generator component that cycles through the plurality of portions that comprise the entirety of the error-indicating acknowledgement information to send the error-indicating acknowledgement information.

A further embodiment of the invention encompasses an article. The article includes a computer-readable signal-bearing medium. The article includes means in the medium for determining a plurality of portions that comprise an entirety of error-indicating acknowledgement information. The article includes means in means in the medium for cycling through the plurality of portions that comprise the entirety of the error-indicating acknowledgement information to send the error-indicating acknowledgement information.

BRIEF DESCRIPTION OF THE DRAWINGS

FIG. 5 is an illustrative table that defines exemplary meanings of a beginning of window flag and an end of window flag employable in the system of FIG. 1.

FIG. 6 is an exemplary depiction of illustrative content of one example of a packet downlink acknowledgement/ negative acknowledgement message that is employable in the system of FIG. 1.

FIG. 7 is an illustrative table of an exemplary number of bits available for an acknowledgement/negative acknowledgement description information element of a communication in the system of FIG. 1 dependent on an inclusion or omission of a channel quality report and a channel request description.

FIG. 9 represents an exemplary explanation of fields of the acknowledgement/negative acknowledgement description information message of FIG. 8.

FIGS. 12–14 depict an exemplary table that is employable by the system of FIG. 1 for compression of bitmap feedback.

DETAILED DESCRIPTION

In accordance with the principles of the present invention, a plurality of portions that comprise an entirety of error-indicating acknowledgement information is determined, and the plurality of portions that comprise the entirety of the error-indicating acknowledgement information is cycled through to send the error-indicating acknowledgement information.

A detailed discussion of one exemplary embodiment of the invention is presented herein, for illustrative purposes.

Figure 1:
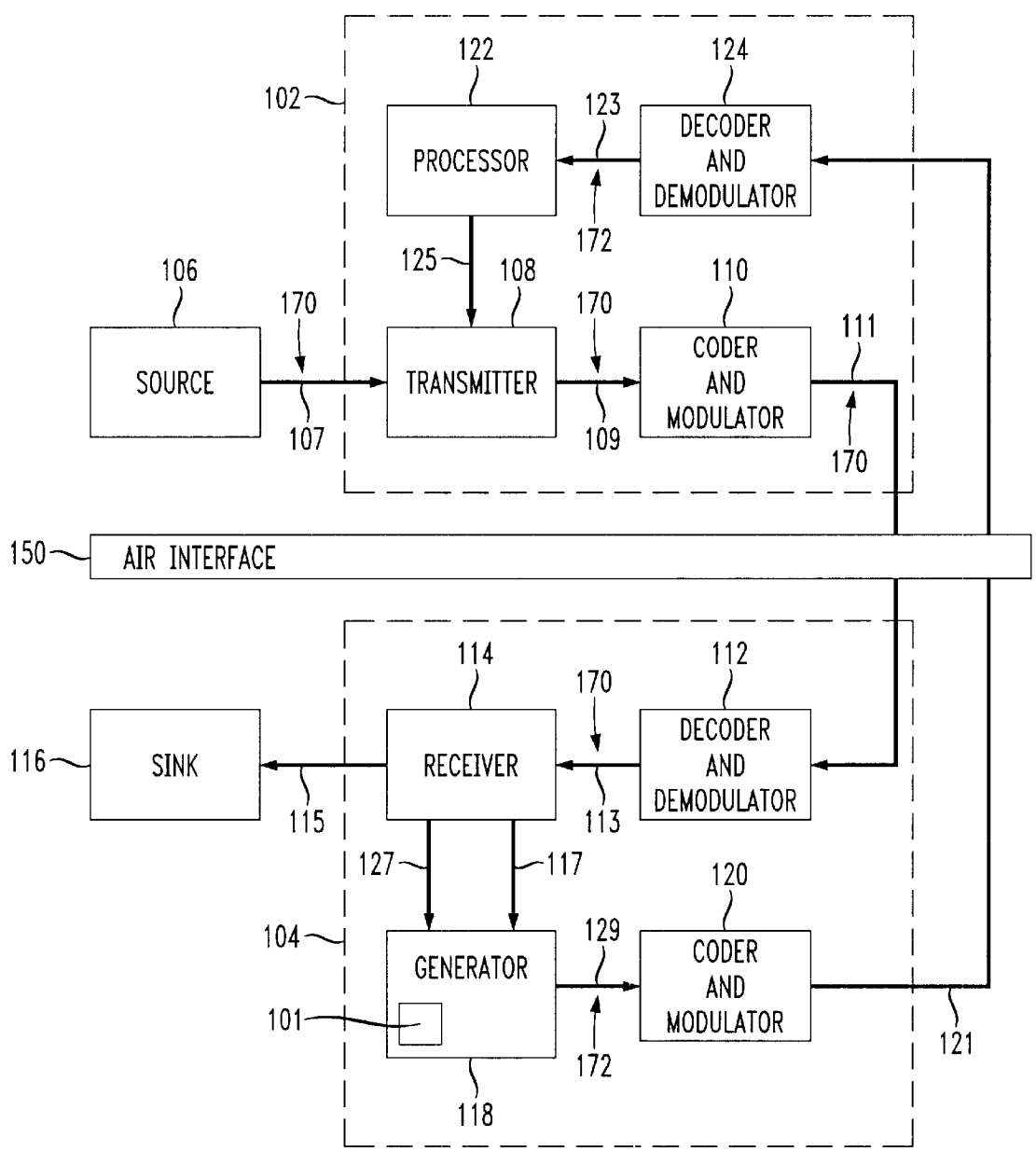
FIG. 1 is a functional block diagram of one example of a system that comprises a transmitting component and a receiving component that sends feedback to the transmitting component.

Turning to FIG. 1, system 100, in one example, includes a plurality of components such as computer software and/or hardware components. For instance, a number of such components can be combined or divided. System 100 in one example employs at least one computer-readable signal-bearing medium. One example of a computer-readable signal-bearing medium for system 100 comprises a recordable data storage medium 101 such as a magnetic, optical, biological, and/or atomic data storage medium. In another example, a computer-readable signal-bearing medium for system 100 comprises a modulated carrier signal transmitted over a network comprising or coupled with system 100, for instance, a telephone network, a local area network ("LAN"), the Internet, and/or a wireless network. An exemplary component of system 100 employs and/or comprises a series of computer instructions written in or implemented with any of a number of programming languages, as will be appreciated by those skilled in the art.

Referring to FIG. 1, one example of system 100 includes source 106, transmitting component 102, air interface 150, receiving component 104, and sink 116. Receiving component 104 provides some form of bitmap feedback to transmitting component 102. In one example, transmitting component 102 comprises a network, and receiving component 104 comprises a mobile unit. In another example, transmitting component 102 comprises a mobile and receiving component 104 comprises a network.

Still referring to FIG. 1, transmitting component 102 in one example comprises transmitter 108, coder/modulator 110, decoder/demodulator 124, and processor 122. Receiving component 104 in one example comprises decoder/demodulator 112, receiver 114, generator 118, and coder/modulator 120.

Figure 2:
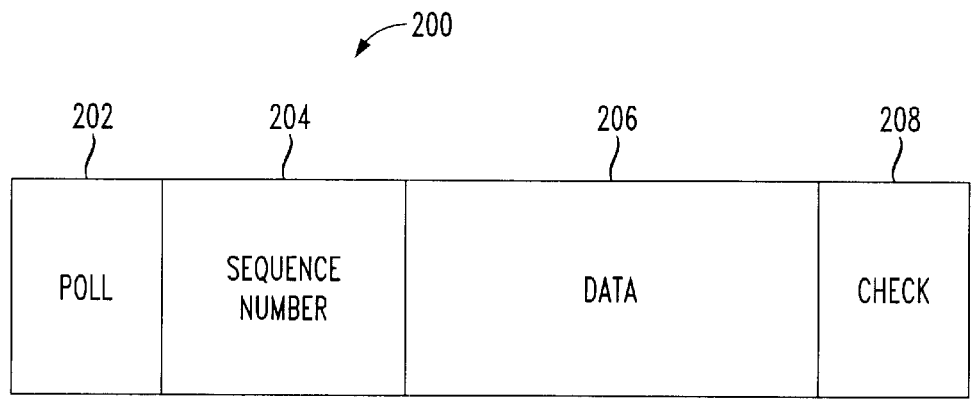
FIG. 2 is one example of a frame that is employable in the system of FIG. 1 for sending information from the transmitting component to the receiving component.

Referring to FIGS. 1–2, in one example, a plurality of components communicate by sending and/or receiving information 170. Information 170 in one example comprises one or more frames 200. For instance, source 106 sends data 107 to transmitter 108. Transmitter 108 formats the data 107 into data 109. Data 109 in one example comprises a sequence of frames 200. Coder/modulator 110 receives data 110 and sends data 111 over air interface 150 to receiving component 104. At receiving component 104, decoder/demodulator 112 receives data 111 from air interface 150 and sends data 113 (e.g., as frames 200) to receiver 114. Frame 200, in one example, comprises poll 202, sequence number 204, data 206, and check 208. In one example, data 206 comprises a Radio Link Control (RLC) block. In a further example, check 208 comprises a cyclical redundancy check (CRC) that is employable in system 100 to evaluate accuracy of data 206 as described herein.

Referring again to FIGS. 1–2, in one example receiver 114 extracts data, 206 from frames 200 of data 113. Receiver 114 determines, using check 208, whether data 206 has been correctly received from transmitting component 102. Receiver 114 sends data 115 to sink 116 and sends receiver state data 117 to generator 118. In one example, receiver 114 also sends feedback request 127 to generator 118. Feedback request 127 in one example comprises poll 202 included in information 170 from transmitting component 104. Generator 118 employs receiver state data 117 to send feedback 129 to coder/modulator 124. In one example feedback 129 comprises bitmap 172 as described herein. Coder/modulator 124 sends data 121 over air interface 150 to transmitting component 102. Still referring to FIGS. 1–2, at transmitting component 102, decoder/demodulator 124 receives data 121. Decoder/demodulator 224 sends data 123 to processor 122. In one example data 123 comprises bitmap data 172 as described herein. Processor 122 sends receiver state data 125 to transmitter 108. By using receiver state data 125, transmitter 108 in one example retransmits data 206 if data 206 was not correctly received by receiving component 104.

Figure 3:
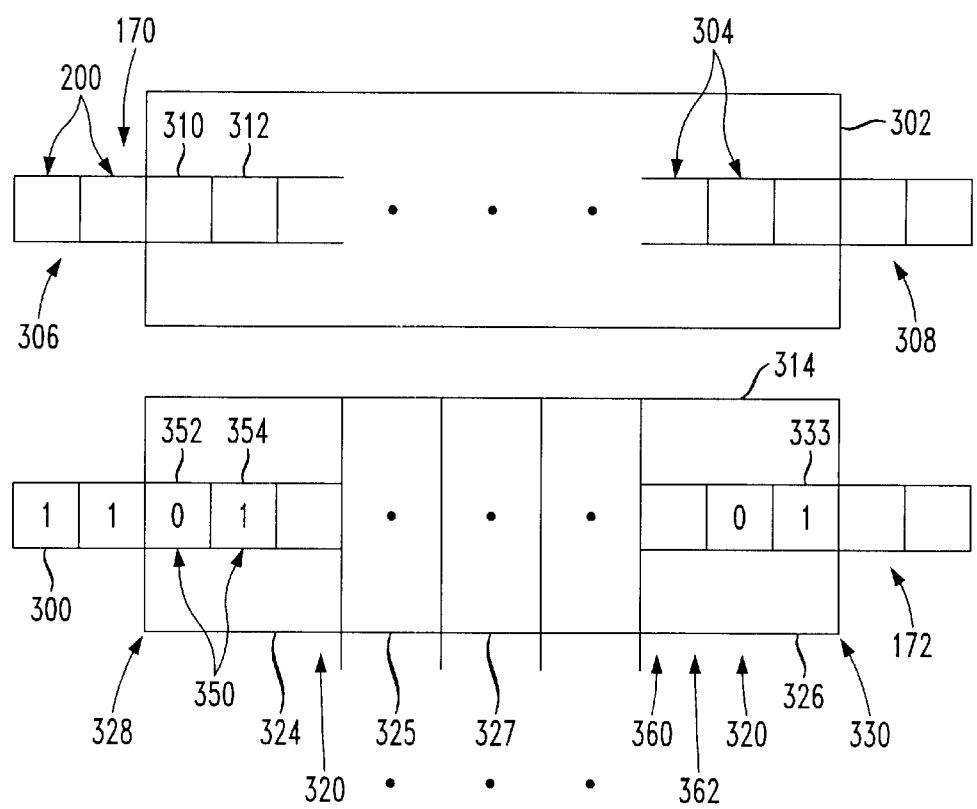
FIG. 3 depicts one example of a transmission window and a corresponding feedback window that is employable in the, system of FIG. 1.

Now referring to FIGS. 1–3, in one example transmitting component 102 transmits to receiving component 104 frames 200, for instance, frames 304, 306, 308, 310, and 312. Frames 304 within transmission window 302 represent frames 200 that transmitting component 102 transmits to receiving component 104 at a particular time t1. Frames 306 represent frames 200 that transmitting component 102 transmitted to receiving component 104 at a time prior to t1. Frames 308 represent frames 200 that transmitting component 102 will transmit to receiving component 104 at a time subsequent to t1. In one example, bitmap data 172 comprises bitmap 300.

Referring again to FIGS. 1–3, bitmap 300 in one example comprises entries 350. In one example, individual entries 350 correspond to individual frames 200 sent from transmitting component 102. For instance, frame 310 corresponds to entry 352, and frame 312 corresponds to entry 354. Generator 118 in one example transmits bitmap 300 as reception window 314 advances. Generator 118 in one example advances reception window 314 to proceed through all entries 350 that comprise bitmap 300. In one example, generator 118 advantageously cycles reception window through groups 360 of entries 350 that comprise segments of bitmap 300, as described herein.

Further referring to FIGS. 1–3, in one example, transmitting component 102 advances transmission window 302 as frames 304 are sent to receiving component 104. In one example, frames 304 include data 206. At receiving component 104, receiver 114 determines whether or not data 206 has been received correctly and sends receiver state data 117 to generator 118. Generator 118 employs receiver state data 117 to initialize and/or update bitmap 300. In one example, generator 118 updates entries 350 of bitmap 300 to more accurately represent the correctness or incorrectness in reception of data 206 at receiving component 104. In one example, if receiver 114 determines that data 206 in frame 312 is received from transmitting component 102 correctly, then generator 118 enters a "1" in entry 354 of bitmap 300. In another example, if receiver 114 determines that data 206 in frame 310 is received from transmitting component incorrectly, then generator 118 enters or maintains a "0" in entry 352 of bitmap 300. In one example, generator 118 sends bitmap 300 to transmitting component 102 as feedback.

Referring again to FIGS. 1–3, in one example bitmap 300 comprises N subportions 320. N in one example equals the number of bitmap portions employed to represent an entirety of reception window 314. In another example, N equals the number of bitmap portions employed to represent only a subportion of reception window 314. In one example, generator 118 cycles through bitmap 300 to send feedback 129 to transmitting component 102 as data 121. In one example, generator 118 sends bitmap 300 to transmitting component 102 by advantageously cycling through bitmap 300, (sub)portion 320 by (sub)portion 320. Examples of portion 320 include bitmap portions 324, 325, 326, and 327, as described herein.

For instance, referring to FIGS. 1–3, generator 118 cycles through all portions 320 that represent unverified correctness, to send bitmap 300 as feedback to transmitting component 102, advantageously substantially without preferential treatment of any particular one of the portions 320, as described herein.

Further referring to FIGS. 1–3, in one example transmitting component 102 sends a poll 202 to generator 118 when bitmap 300 fits within a single instance of portion 320 that comprises reception window 314. One example of generator 118, in response to receipt by generator 118 of the poll 202 from transmitting component 102, sends bitmap 300 to transmitting component 102 in the single instance of portion 320 that comprises reception window 314.

Still referring to FIGS. 1–3, in another example bitmap 300 comprises multiple subportions 320. The multiple subportions 320, in one example, comprises an entirety of reception window 314. Transmitting component 102 in one example sends a plurality of polls 202 to generator 118 when bitmap 300 comprises the multiple subportions 320 that fit within one instance of reception window 314. One example of generator 118, in response to receipt by generator 118 of the plurality of polls 202 from transmitting component 102, sends bitmap 300 to transmitting component 102 in the multiple subportions 320. For example, generator 118, in response to the plurality of polls 202, cycles through the multiple subportions 320, to provide feedback that represents incorrectness or unverified correctness for a transmission from transmitting component 102 that comprises transmission window 302.

For example, referring to FIGS. 1–3, in response to receiving a first instance of poll 202 from transmitting component 102, generator 118 sends bitmap portion 324 to transmitting component 102. In response to receiving a second instance of poll 202 from transmitting component 102, generator 118 sends bitmap portion 325 to transmitting component 102. In response to receiving a third instance of poll 202 from transmitting component 102, generator 118 sends bitmap portion 327 to transmitting component 102, etc., through an instance of poll 202 from transmitting component 102 responsive to which generator 118 sends "last" bitmap portion 326 to transmitting component 102. If generator 118 receives poll 202 from transmitting component 102 after sending "last" bitmap portion 326 to transmitting component 102, then generator 118 cycles to send "first" bitmap portion 324.

Referring further to FIGS. 1–3, transmitting component 102 in one example sends polls 202 to generator 118 as a function of time. For instance, transmitting component 102 sends a first poll 202 to generator 18, and generator 118 responds to the first poll 202 by sending information to transmitting component 102. In addition, transmitting component 102 sends a second poll 202 to generator 118 a predetermined period of time after sending the first poll 202 to generator 118, and generator 118 responds to the second poll 202 by sending information to transmitting component 102.

In another example, referring to FIGS. 1–3, transmitting component 102 sends polls 202 to generator 118 on an event basis or activity basis. For example, transmitting component 102 sends a first poll 202 to generator 118, and generator 118 responds to the first poll 202 by sending information to transmitting component 102. After transmitting component 102 sends a predetermined number of frames 200 to generator 118, transmitting component 102 sends a second poll 202 to generator 118, and generator 118 responds to the second poll 202 by sending information to transmitting component 102.

Figure 4:
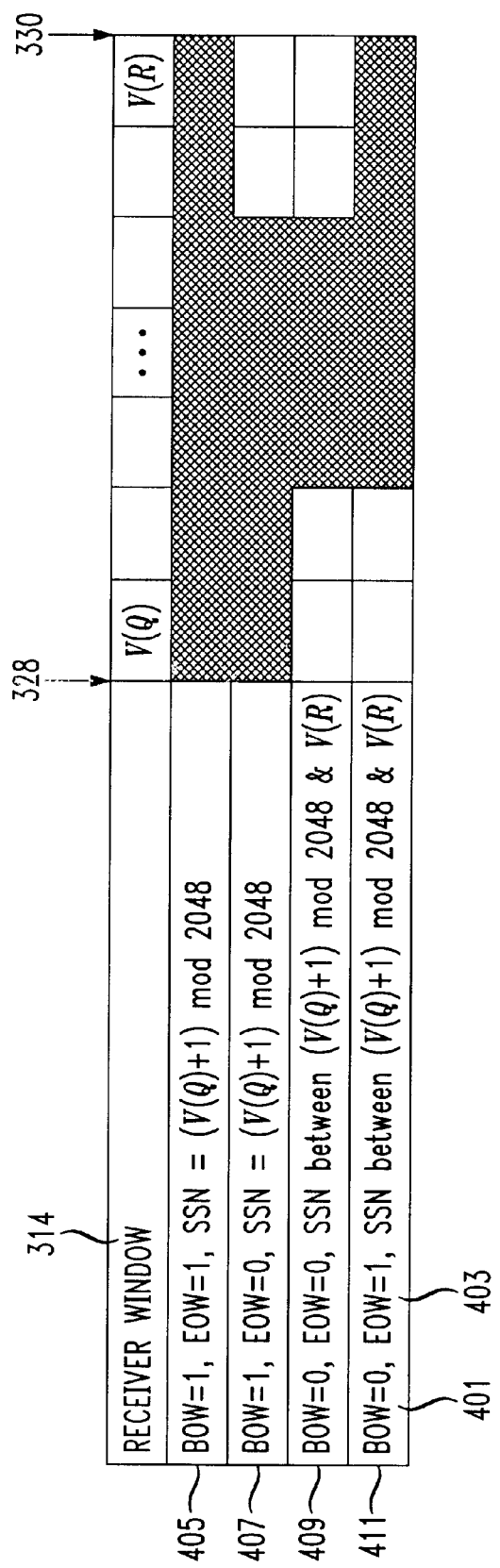
FIG. 4 depicts an illustrative range for one example of a feedback window that is employable in the system of FIG. 1.

Turning to FIGS. 4–5, in one example, V(Q) represents a beginning 328 of reception window 314. V(Q) in one example is the largest sequence number 204 (FIG. 2) of data 206 prior to which all instances of data 206 have been received in sequence. In one example, V(R) equals an end 330 of reception window 314. For example, V(R) represents the last instance of data 206 that has been correctly received by receiving component 102. In one example, generator 118 sends beginning of window (BOW) flag 401 and end of window (EOW) flag 403 with bitmap portion 320 (FIG. 3). In one example, the value of BOW flag 401 represents the inclusion in or omission from bitmap portion 320, of V(Q). In one example, EOW flag 403 represents the inclusion in or omission from bitmap portion 320, of V(R).

Referring again to FIGS. 4–5, in a first example 405, if both BOW="1" and EOW="1", then bitmap 300 (FIG. 3) fits in a single portion 320 and cycling is unnecessary. In a second example 407, if BOW="1" and EOW="0," then V(Q) is included with bitmap portion 320, but V(R) is not. In a third example 409, if BOW="0" and EOW="0," then bitmap portion 320 represents a middle portion of reception window 314. In a fourth example 411, if BOW="0" and EOW="1," then bitmap portion 320 represents a trailing portion of reception window 314. In one example, EOW="1" serves to implicitly negatively acknowledge all data 206 that corresponds to sequence numbers 204 modulo greater than the last "1" 333 (FIG. 3) in bitmap 300. In a further example, BOW="1" serves to implicitly acknowledge all data 206 prior to beginning 328 of reception window 314. Thus, in one example, generator 118 uses BOW flag 401 and EOW flag 403 to acknowledge or negatively acknowledge data 206 without transmitting bitmap portions 320 corresponding to all instances of data 206.

Turning to FIGS. 6–7, in one example generator component 118 sends bitmap portions 320 as data 129 in a message format 600. Message format 600 in one example comprises message type 602, downlink temporary flow identifier (TFI) 604, and temporary block flow (TBF) release 606, channel quality report 608, channel request description 610, and acknowledgement/negative acknowledgment (Ack/Nack) description 612. In one example, channel quality report 608 and channel request description 610 are optionally included. With respect to channel quality report 608, in one example, if the first bit is asserted high ("H"), or is "1," then the next forty-seven bits comprise channel quality report 608. With respect to channel request description 610, if the first bit is asserted high "H", or is "1", then the next twenty-four bits comprise channel request description 610. In one example, bitmap portions 320 are included in Ack/Nack description 612, which comprises length L bits. L, in one example, comprises seventy-seven, one hundred one, one hundred twenty-four, or one hundred forty-eight bits. The value of L depends on whether channel quality report 508 is included and whether channel request description 610 is included.

Figure 8:
FIG. 8 depicts one example of an acknowledgement/ negative acknowledgement description information message that is employable in the system of FIG. 1.

Turning to FIGS. 8–9, in one example Ack/Nack description 612 comprises exemplary format 800. FIG. 9 represents exemplary descriptions for portions of format 800, including Final_Ack_Indication 801, BOW 401, EOW 403, Starting_Sequence_Number 803, Compressed_Bitmap_ Length 805, Compressed_Bitmap_Starting_Color_ Code_807, Compressed_Received_Block_Bitmap 809, and Uncompressed_Received_Block_Bitmap 811.

Figure 10:
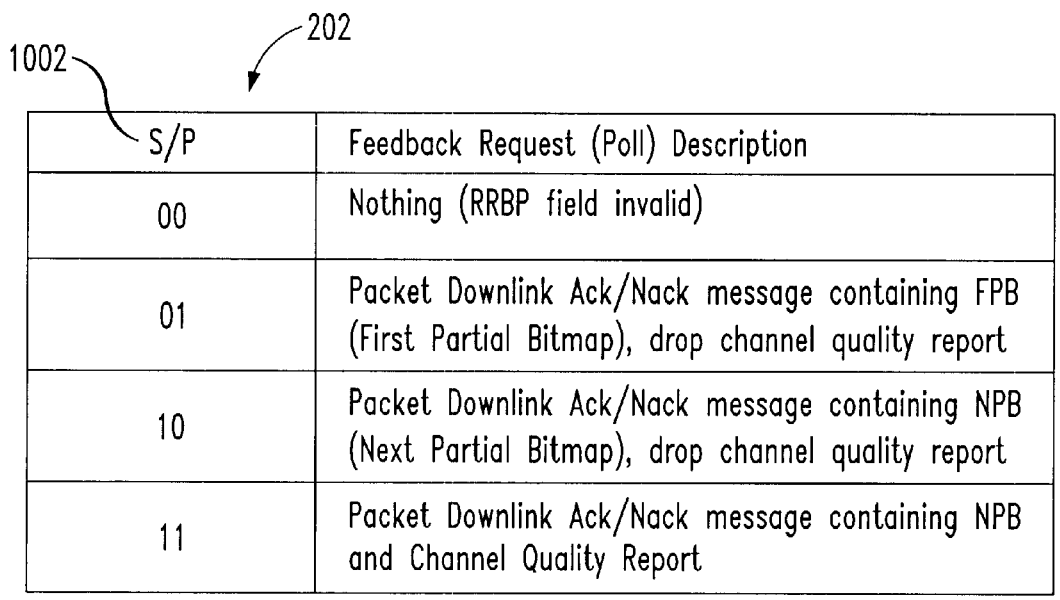
FIG. 10 depicts an illustrative definition of exemplary poll values that are transmittable by one example of the transmitting component of FIG. 1.
Figure 11:
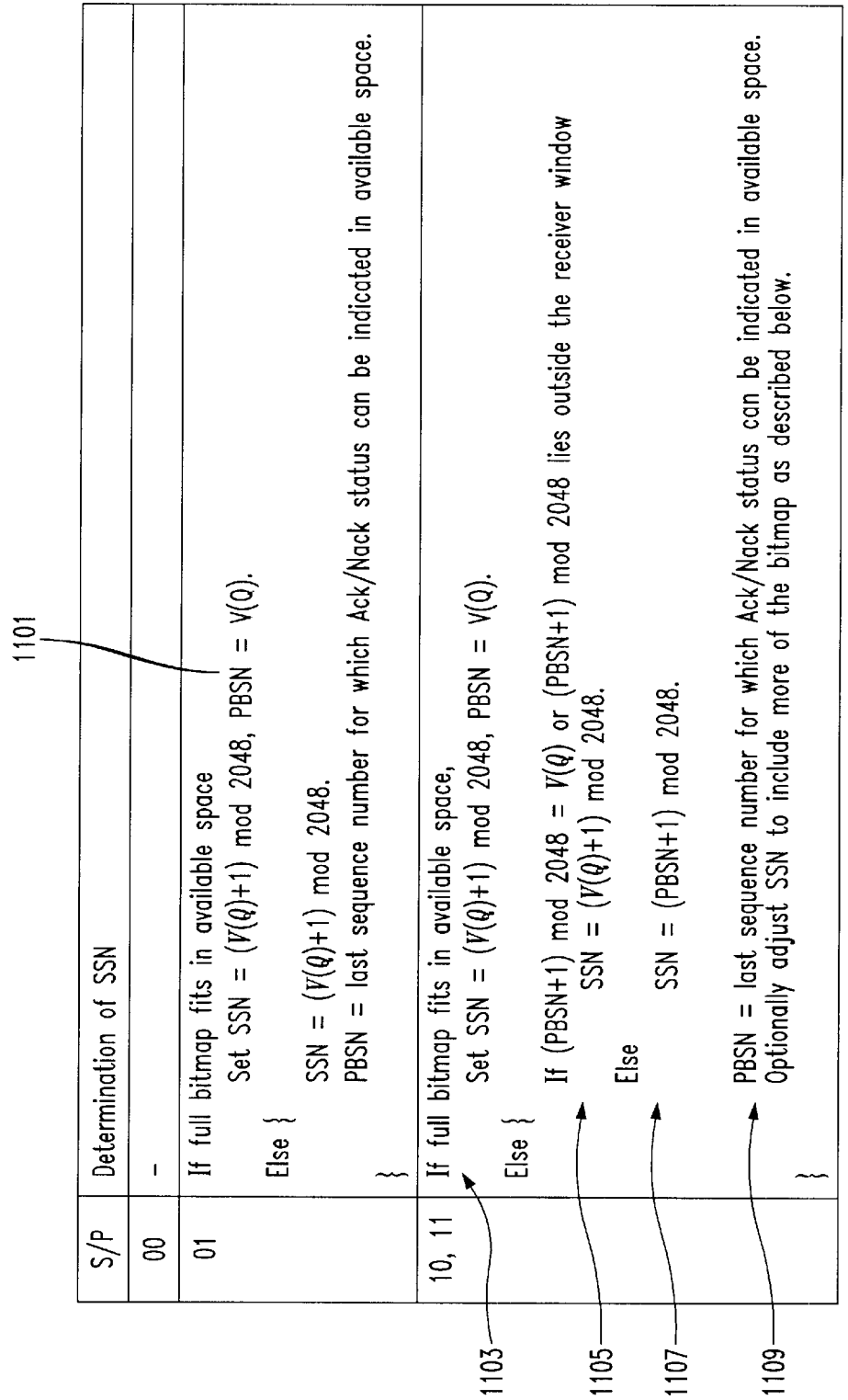
FIG. 11 represents exemplary logic for determination of a starting sequence number when sending bitmap feedback in the system of FIG. 1.

Referring now to FIGS. 3 and 10, poll 202 in one example comprises (e.g., 2 bit) supplementary polling (S/P) field 1002. In one example, transmitting component 102 sends to receiving component 104 a value of "01" for S/P field 1002. Thereby, transmitting component 102 requests that generator 118 send "first" bitmap portion 324 and requests that generator 118 not send a channel quality report 608 with the "first" bitmap portion 324. In another example, transmitting component 102 sends to receiving component 104 a value of "10" for S/P field 1002. Thereby, transmitting component 102 requests "next" bitmap portion 325 without a channel quality report 608. "Next" bitmap portion 325 in one example comprises a bitmap portion 320 to which generator 118 advances reception window 314 in a cycle after sending the "first" bitmap portion 324. Therefore, in one example, bitmap portion 325 is "next" after "first" bitmap portion 324. In another example, bitmap portion 327 is "next" after bitmap portion 325. In a further example, "first" bitmap portion 324 is "next" in the cycle after bitmap portion 326. In one example, transmitting component 102 sends receiving component 104 a value of "11" for S/P field 1002. Thereby, transmitting component 102 requests that generator 118 send a "next" bitmap portion 320, and requests that generator 118 send channel quality report 608 with "next" bitmap portion 320.

With reference to FIGS. 1, 3, 8, and 10–11, now is described one example of logic that is employable by system 100 for determination of starting sequence number (SSN) 803 when sending bitmap feedback 129. SSN 803 in one example comprises the sequence number 204 of the first entry 350 in a bitmap portion 320 that generator 118 sends to transmitting component 102. In one example, transmitting component 102 polls for "first" bitmap portion 324 (S/P=01). In one example, the full bitmap 300 fits in reception window 314. Generator 118 sets SSN equal to V(Q)+1 mod 2048. Generator 118 sets partial bitmap sequence number (PBSN) 1101 equal to V(Q).

Referring to FIGS. 1, 3, 8, and 10–11, in a further example, transmitting component 102 polls for first bitmap portion 324 (S/P=01). Bitmap 300 in one example does not fit in reception window 314. Generator 118 sets SSN equal to V(Q)+1 mod 2048. Generator 118. sets PBSN equal to the last sequence number 204 for which bitmap feedback 129 is indicated in reception window 314. In example 1103, transmitting component 102 polls for "next" bitmap portion 320 (e.g., S/P=10 or 11). Bitmap 300 in one example fits in reception window 314. Generator 118 sets SSN equal to V(Q)+1 mod 2048. Generator 118 sets PBSN 1101 equal to V(Q). In example 1105, transmitting component 102 polls for "next" bitmap portion 320 (e.g., S/P=10 or 11). Bitmap 300 does not fit in reception window 314. PBSN+1=V(Q) or PBSN+1 lies outside of reception window 314. Generator 118 sets SSN equal to V(Q)+1 mod 2048. In example 1107, transmitting component 102 polls for "next" bitmap portion 320 (e.g., S/P=10 or 11). Bitmap 300 in one example does not fit in reception window 314. PBSN+1 does not equal V(Q) and PBSN+1 does not lie outside of reception window 314. Generator 118 sets SSN equal to PBSN+1 mod 2048. Thus, in one example, if reception window 314 advances in a cycle, or if generator 118 has cycled bitmap 300 through the "last" portion 326, generator 118 transmits bitmap portion 320 that is located at beginning 328 of the most current reception window 314; otherwise, generator 118 in one example begins where generator 118 had stopped upon transmission of a previous bitmap portion 320.

In another example 1109, PBSN is very close to end 330 of bitmap 300. Available payload is less than the number of bits in the "last" portion 326. For example, if bitmap 300 were one hundred bits long and the bitmap portions 320 were each forty bits long, then after sending two bitmap portions, only twenty bits would be left in reception window 314 for indicating error in the transmission. So, in this example, PBSN is shifted twenty bits. Thus generator 118 retransmits the immediately preceding twenty bits as part of the final forty bit of this one hundred bit reception window 314.

Turning to FIGS. 12–14, in one example, system 100 improves throughput by compressing portions of bitmap 300. In example 1201, a run of twenty "1"s is represented by seven bits (00010000). In another example 1203, a run of ten zeros is represented by seven bits (00010000). For runs of ones or zeros longer than sixty-four, make up codes 1400 are used. For example, a run of ninety-five ones is represented by code word 1401 that represents a run of sixty-four ones (11011) in conjunction with code word 1205 that represents a run of thirty-one ones (00011010). The foregoing compression scheme is only presented as an example. Other compression schemes could be employed as will be appreciated by those skilled in the art.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method comprising the steps of:
   determining a plurality of portions that comprise an entirety of error-indicating acknowledgement information; and
   cycling through the plurality of portions that comprise the entirety of the error-indicating acknowledgement information to send the error-indicating acknowledgement information.

2. The method of claim 1, wherein the determining step comprises the step of:
   receiving a plurality of polls; and wherein the cycling step is responsive to the polls.

3. The method of claim 2, wherein the receiving step comprises:
   receiving a poll that requests transmission of a beginning portion of the error-indicating acknowledgment information.

4. The method of claim 2, wherein the receiving step comprises the steps of:
   receiving a poll that requests transmission of a first portion of the error-indicating acknowledgement information; and
   receiving a poll that requests transmission of a second portion of the error-indicating acknowledgement information; wherein the second portion of the error-indicating acknowledgement information comprises a portion of the error-indicating acknowledgment information that is consecutive to the first portion of the error-indicating acknowledgement information in a cycle.

5. The method of claim 2, wherein the receiving step comprises steps of:
   receiving a first poll; and
   receiving a second poll a predetermined period of time after the first poll.

6. The method of claim 2, wherein the receiving step comprises the steps of:
   receiving a first poll; and
   receiving a second poll a predetermined number of data units sent by a transmitter component after the first poll.

7. The method of claim 1, wherein the cycling step comprises the steps of:
- updating the error-indicating acknowledgment information to obtain updated error-indicating acknowledgement information that comprises a plurality of updated error-indicating portions; and
- sending the updated error-indicating acknowledgment information.

8. The method of claim 1, wherein the cycling step comprises the step of:
- indicating whether a portion of the plurality of portions comprises a beginning portion of the error-indicating acknowledgment information.

9. The method of claim 8, wherein the indicating step comprises the steps of:
- sending an indication that comprises an implicit acknowledgment that a plurality of data units have been received in sequence; and
- sending an indication that comprises an implicit negative acknowledgment for a data unit that is subsequent to the plurality of data units.

10. The method of claim 1, wherein the cycling step comprises the step of:
- indicating whether a portion of the plurality of portions comprises an ending portion of the acknowledgment information.

11. The method of claim 10, wherein the cycling step comprises the steps of:
- sending a portion of error-indicating acknowledgment information that corresponds to a current cycle; and
- retransmitting a subpart of error-indicating acknowledgment information from a cycle that is previous to the current cycle.

12. The method of claim 1, wherein the determining step comprises the step of:
- determining an amount of error-indicating acknowledgment information based on a payload size for a feedback message.

13. The method of claim 1, wherein the cycling step comprises the step of:
- compressing a portion of the error-indicating acknowledgment information.

14. The method of claim 13, wherein the compressing step comprises the step of:
- employing run-length coding to compress the portion of the error-indicating acknowledgment information.

15. The method of claim 14, wherein the employing step comprises the step of:
- indicating whether the run-length coding starts with a run of ones or zeros.

16. The method of claim 1, wherein the determining step comprises the step of:
- determining that one portion of the plurality of portions of the error-indicating acknowledgment information fits in a feedback segment.

17. The method of claim 1, wherein the determining step comprises the step of:
- determining error-indicating acknowledgment information that comprises a receipt status bitmap that corresponds to data units of a transmission.

18. A system comprising:
- a generator component that determines a plurality of portions that comprise an entirety of error-indicating acknowledgement information; and
- a generator component that cycles through the plurality of portions that comprise the entirety of the error-indicating acknowledgement information to send the error-indicating acknowledgement information.

19. The system of claim 18, wherein the generator component that determines comprises:
- a generator component that receives a plurality of polls; and
- wherein the generator component that cycles is responsive to the polls.

20. The system of claim 19, wherein the generator component that receives the plurality of polls comprises:
- a generator component that receives a poll that requests transmission of a beginning portion of the error-indicating acknowledgment information.

21. The system of claim 19, wherein the generator component that receives the plurality of polls comprises:
- a generator component that receives a poll that; requests transmission of a first portion of the error-indicating acknowledgement information; and
- a generator component that receives a poll that requests transmission of a second portion of the error-indicating acknowledgement information; wherein the second portion of the error-indicating acknowledgement information comprises a portion of the error-indicating acknowledgment information that is consecutive to the first portion of the error-indicating acknowledgement information in a cycle.

22. The system of claim 19, wherein the generator component that receives the plurality of polls comprises:
- a generator component that receives a first poll; and
- a generator component that receives a second poll a predetermined period of time after the first poll.

23. The system of claim 19, wherein the generator component that receives the plurality of polls comprises:
- a generator component that receives a first poll; and
- a generator component that receives a second poll a predetermined number of data units sent by a transmitter component after the first poll.

24. The system of claim 18, wherein the generator component that cycles comprises:
- a generator component that updates the error-indicating acknowledgment information to obtain updated error-indicating acknowledgement information that comprises a plurality of updated error-indicating portions; and
- a generator component that sends the updated error-indicating acknowledgment information.

25. The system of claim 18, wherein the generator component that cycles comprises:
- a generator component that indicates whether a portion of the plurality of portions comprises a beginning portion of the error-indicating acknowledgment information.

26. The system of claim 25, wherein the generator component that indicates whether the portion of the plurality of portions comprises the beginning portion of the error-indicating acknowledgment information comprises:
- a generator component that sends an indication that comprises an implicit acknowledgment that a plurality of data units have been received in sequence; and
- a generator component that sends an indication that comprises an implicit negative acknowledgment for a data unit that is subsequent to the plurality of data units.

27. The system of claim 18, wherein the generator component that cycles comprises:

a generator component that indicates whether a portion of the plurality of portions comprises an ending portion of the acknowledgment information.

28. The system of claim 27, wherein the generator component that cycles comprises:
a generator component that sends a portion of the error-indicating acknowledgment information that corresponds to a current cycle; and
a generator component that retransmits a subpart of error-indicating acknowledgment information from a cycle that is previous to the current cycle.

29. The system of claim 18, wherein the generator component that determines the plurality of portions that comprise the entirety of the error-indicating acknowledgement information comprises:
a generator component that determines an amount of error-indicating acknowledgment based on a payload size for a feedback message.

30. The system of claim 18, wherein the generator component that cycles comprises:
a generator component that compresses a portion of the error-indicating acknowledgment information.

31. The system of claim 30, wherein the generator component that compresses the portion of the error-indicating acknowledgment information comprises:
a generator component that employs run length-coding to compress the portion of the error-indicating acknowledgment information.

32. The system of claim 31, wherein the generator component that employs run length coding comprises:
a generator component that indicates whether the run-length coding starts with a run of ones or zeros.

33. The system of claim 18 wherein the generator component that determines the plurality of portions that comprise the entirety of the error-indicating acknowledgement information comprises:
a generator component that determines that one portion of the plurality of portions of the error-indicating acknowledgment information fits in a feedback segment.

34. The system of claim 18, wherein the generator component that determines the plurality of portions that comprise the entirety of the error-indicating acknowledgement information comprises:
a generator component that determines error-indicating acknowledgment information that comprises a receipt status bitmap that corresponds to data units of a transmission.

35. An article comprising:
a computer-readable signal-bearing medium;
means in the medium for determining a plurality of portions that comprise an entirety of error-indicating acknowledgement information; and
means in the medium for cycling through the plurality of portions that comprise the entirety of the error-indicating acknowledgement information to send the error-indicating acknowledgement information.

36. The article of claim 35, wherein the means in the medium for determining comprises:
means in the medium for receiving a plurality of polls; and wherein the means in the medium for cycling is responsive to the polls.

37. The article of claim 36, wherein the means in the medium for receiving the plurality of polls comprises:
means in the medium for receiving a poll that requests transmission of a beginning portion of the error-indicating acknowledgment information.

38. The article of claim 36, wherein the means in the medium for receiving the plurality of polls comprises:
means in the medium for receiving a poll that requests transmission of a first portion of the error-indicating acknowledgement information; and
means in the medium for receiving a poll that requests transmission of a second portion of the error-indicating acknowledgement information; wherein the second portion of the error-indicating acknowledgement information comprises a portion of the error-indicating acknowledgment information that is consecutive to the first portion of the error-indicating acknowledgement information in a cycle.

39. The article of claim 36, wherein the means in the medium for receiving the plurality of polls comprises:
means in the medium for receiving a first poll; and
means in the medium for receiving a second poll a predetermined period of time after the first poll.

40. The article of claim 36, wherein the means in the medium for receiving the plurality of polls comprises:
means in the medium for receiving a first poll; and
means in the medium for receiving a second poll a predetermined number of data units sent by a transmitter component after the first poll.

41. The article of claim 35, wherein the means in the medium for cycling comprises:
means in the medium for updating the error-indicating acknowledgment information to obtain updated error-indicating acknowledgement information that comprises a plurality of updated error-indicating portions; and
means in the medium for sending the updated error-indicating acknowledgment information.

42. The article of claim 35, wherein the means in the medium for cycling comprises:
means in the medium for indicating whether a portion of the plurality of portions comprises a beginning portion of the error-indicating acknowledgment information.

43. The article of claim 42, wherein the means in the medium for indicating comprises:
means in the medium for sending an indication that comprises an implicit acknowledgment that a plurality of data units have been received in-sequence, and
means in the medium for sending an indication that comprises an implicit negative acknowledgment for a first data unit that is subsequent to the plurality of data units.

44. The article of claim 35, wherein the means in the medium for cycling comprises:
means in the medium for indicating whether a portion of the plurality of portions comprises an ending portion of the acknowledgment information.

45. The article of claim 44, wherein the means in the medium for cycling comprises:
means in the medium for sending a portion of error-indicating acknowledgment information that corresponds to a current cycle; and
means in the medium for retransmitting a subpart of error-indicating acknowledgment information from a cycle that is previous to the current cycle.

46. The article of claim 35, wherein the means in the medium for determining comprises:
means in the medium for determining an amount of error-indicating acknowledgment information based on a payload size for a feedback message.

47. The article of claim 35, wherein the means in the medium for cycling comprises:

means in the medium for compressing a portion of the error-indicating acknowledgment information.

48. The article of claim 47, wherein the means in the medium for compressing comprises:

means in the medium for employing run-length coding to compress the portion of the error-indicating acknowledgment information.

49. The article of claim 48, wherein the means in the medium for employing comprises:

means in the medium for indicating whether the run-length coding starts with a run of ones or zeros.

50. The article of claim 35, wherein the means in the medium for determining comprises means in the medium for determining that one portion of the plurality of portions of the error-indicating acknowledgment information fits in a feedback segment.

51. The article of claim 35, wherein the means in the medium for determining comprises:

means in the medium for determining error-indicating acknowledgment information that comprises a receipt status bitmap that corresponds to data units of a transmission.

* * * * *